US011402732B2

(12) United States Patent
Yeung et al.

(10) Patent No.: US 11,402,732 B2
(45) Date of Patent: Aug. 2, 2022

(54) DYNAMIC PROJECTION DEVICE, METHOD AND PROJECTOR

(71) Applicant: IVIEW DISPLAYS (SHENZHEN) COMPANY LTD., Shenzhen (CN)

(72) Inventors: Steve Yeung, Shenzhen (CN); Zhiqiang Gao, Shenzhen (CN); Wenxiang Li, Shenzhen (CN); Mingnei Ding, Shenzhen (CN); Tianshu Zhang, Shenzhen (CN)

(73) Assignee: IVIEW DISPLAYS (SHENZHEN) COMPANY LTD., Shenzhen (CN)

( * ) Notice: Subject to any disclaimer, the term of this patent is extended or adjusted under 35 U.S.C. 154(b) by 0 days.

(21) Appl. No.: 17/226,728

(22) Filed: Apr. 9, 2021

(65) Prior Publication Data
US 2021/0223670 A1    Jul. 22, 2021

Related U.S. Application Data

(63) Continuation of application No. PCT/CN2019/103835, filed on Aug. 30, 2019.

(30) Foreign Application Priority Data

Jun. 19, 2019   (CN) .......................... 201910533118.3

(51) Int. Cl.
  *G03B 21/14*   (2006.01)
  *G03B 21/26*   (2006.01)
  *H04N 9/31*    (2006.01)
(52) U.S. Cl.
  CPC ........... *G03B 21/142* (2013.01); *G03B 21/26* (2013.01); *H04N 9/3102* (2013.01)

(58) Field of Classification Search
  CPC ...... G03B 21/26; G03B 21/28; G03B 21/142; G03B 21/208; H04N 9/315; H04N 9/3102;
  (Continued)

(56) References Cited

U.S. PATENT DOCUMENTS

2006/0152682 A1    7/2006  Matsuda et al.
2008/0239246 A1*  10/2008  Yamamoto ............. G03B 21/26
                                                      353/69

(Continued)

FOREIGN PATENT DOCUMENTS

CN    105262968 A    1/2016
CN    107024825 A    8/2017
(Continued)

*Primary Examiner* — Sultan Chowdhury
(74) *Attorney, Agent, or Firm* — Carter, Deluca & Farrell LLP; George Likourezos (57) ABSTRACT

Embodiments of the present disclosure relate to the technical field of digital projection display, and disclose a dynamic projection device, a dynamic projection method, and a projector. The device includes: a projection unit configured to output a projection picture according to a projection image; a reflection unit configured to reflect the projection picture to a target projection position; an angle calculation unit connected with the reflection unit and configured to calculate a rotation angle of the reflection unit; and an image correction unit connected with the angle calculation unit and the projection unit, respectively, and configured to correct the projection image according to the rotation angle. The present disclosure adjusts the projection direction by controlling the reflection unit with simple structure and light weight, realizing convenient direction control and high-quality projection display, and covering a wide area of the projection environment.

12 Claims, 5 Drawing Sheets

(58) Field of Classification Search
CPC .. H04N 9/3173; H04N 9/3179; H04N 9/3185; H04N 9/3194
See application file for complete search history.

(56) References Cited

U.S. PATENT DOCUMENTS

| | | |
|---|---|---|
| 2009/0237620 A1 | 9/2009 | Yamamoto et al. |
| 2011/0304825 A1* | 12/2011 | Sieler ................ G02B 27/0101 353/20 |
| 2013/0329193 A1* | 12/2013 | Tatsumi ............. G03B 21/2053 353/31 |
| 2015/0109586 A1* | 4/2015 | Masuda ............. G02B 26/0841 353/31 |
| 2017/0264873 A1* | 9/2017 | Muramatsu ............ G03B 21/28 |
| 2017/0269360 A1 | 9/2017 | Yamaguchi et al. |
| 2018/0178650 A1* | 6/2018 | Fujita .................. G03B 21/142 |

FOREIGN PATENT DOCUMENTS

| | | |
|---|---|---|
| CN | 107065409 A | 8/2017 |
| CN | 108243332 A | 7/2018 |
| CN | 108319171 A | 7/2018 |
| WO | 2013035487 A1 | 3/2013 |

* cited by examiner

DYNAMIC PROJECTION DEVICE, METHOD AND PROJECTOR

CROSS-REFERENCE TO RELATED APPLICATIONS

This application is a continuation-application of International (PCT) Patent Application No. PCT/CN2019/103835, filed on Aug. 30, 2019, which claims priority to Chinese Patent Application No. 201910533118.3, filed with the National Intellectual Property Administration of China on Jun. 19, 2019, and entitled "DYNAMIC PROJECTION DEVICE, METHOD AND PROJECTOR", the entire contents of which are incorporated herein by reference.

TECHNICAL FIELD

The present disclosure relates to the technical field of digital projection display, in particular to a dynamic projection device, a dynamic projection method, and a projector.

BACKGROUND

With the rapid development of semiconductor display technology, various portable electronic devices are continuously designed and manufactured. The widespread use of portable electronic devices, in turn, drives the development of display devices required by users towards miniaturization, high resolution, and mobility. Driven by these strong demands, projection technology has developed rapidly, and a variety of portable projectors with small size and high performance have appeared on the market. Since multiple application scenarios require dynamic projection, such as homes or large stages, portable projection devices also need to be able to perform multi-directional projection according to user instructions, and need to be synchronized with the projection content to build an immersive experience through the combination of motion and content.

In the process of implementing the present disclosure, the inventors found that the above related technologies have at least the following problems: at present, most portable dynamic projection devices adopt immature dynamic projection solutions, and simply move the projection picture, which usually results in distortion when the projection picture is projected to the target projection position.

SUMMARY

An embodiment of the present disclosure provides a dynamic projection device including: a projection unit configured to output a projection picture according to a projection image; a reflection unit configured to reflect the projection picture to a target projection position; an angle calculation unit connected with the reflection unit and configured to calculate a rotation angle of the reflection unit; and an image correction unit connected with the angle calculation unit and the projection unit, respectively, and configured to correct the projection image according to the rotation angle.

An embodiment of the present disclosure provides a dynamic projection method including: calculating a rotation angle of a reflection unit; correcting a projected image according to the rotation angle; outputting a projection picture according to the projection image; and reflecting the projection picture to a target projection position by the reflection unit.

An embodiment of the present disclosure provides a projector including: a projection lens, and a micro-controller configured to control the projection lens to project a projection picture, the micro-controller being capable of performing a dynamic projection method as described above.

BRIEF DESCRIPTION OF THE DRAWINGS

One or more embodiments are exemplified by the figures in the corresponding drawings. These example descriptions do not constitute a limitation on the embodiments. The components/modules and steps with the same reference numerals in the drawings represent for similar components/modules and steps, unless otherwise stated, and the figures in the drawings do not constitute a limitation of scale.

FIG. 8(*a*) is a schematic diagram of a coverage area of a projection area when the dynamic projection device provided by an embodiment of the present disclosure is at an edge of a room.

FIG. 8(*b*) is a schematic diagram of a coverage area of a projection area when the dynamic projection device provided by an embodiment of the present disclosure is at a corner of the room.

DETAILED DESCRIPTION

The present disclosure will be described in detail below in conjunction with specific embodiments. The following examples will help those skilled in the art to further understand the present disclosure, but do not limit the present disclosure in any form. It should be pointed out that for those of ordinary skill in the art, a number of modifications and improvements can be made without departing from the concept of the present disclosure. These are within the scope of the disclosure.

In order to make the purpose, technical solutions, and advantages of the present application clearer, the following further describes the present application in detail with reference to the accompanying drawings and embodiments. It should be understood that the specific embodiments described herein are merely illustrative of the present application and are not intended to be limiting thereof.

It should be noted that if there is no conflict, the various features in the embodiments of the present disclosure can be combined with each other, and all fall within the scope of the present application. In addition, although the functional modules are divided in the schematic diagram of the device, and the logical sequence is shown in the flowchart, in some cases, it may be different from the module division in the device, or the sequence shown in the flowchart or the steps described.

Unless defined otherwise, all technical and scientific terms used herein have the same meaning as commonly understood by one of ordinary skill in the art to which this utility model belongs. The terms used in the description of the utility model in this specification are only for the purpose of describing specific implementations, and are not used to limit the utility model. As used herein, the term "and/or" includes any and all combinations of one or more of the associated listed items.

In addition, the technical features involved in the various embodiments of the present disclosure described below can be combined with each other as long as they do not conflict with each other.

The existing dynamic projection schemes are not mature enough, most of them simply move the projection picture, with limited moving space. In addition, most of the existing dynamic projection schemes directly move the projection optical machine. Since the projector involves multiple components such as digital micro-mirror wafers, heat sinks, and light sources, it requires a lot of power when moving, and the control is complicated, prone to failure.

In order to solve the problems, embodiments of the present disclosure provide a dynamic projection device, a dynamic projection method, and a projector; the device can adjust the projection direction by controlling the reflection unit, and correct the projection picture, thereby realizing convenient high-quality dynamic projection, and can be used in a variety of scenes. The present disclosure adjusts the projection direction by controlling the reflection unit with simple structure and very light weight, realizing convenient direction control and high-quality projection display, and covering a wide area of the projection environment; it can be used in various scenes such as homes and stages.

Specifically, the embodiments of the present disclosure will be further described below in conjunction with the accompanying drawings.

Figure 1:
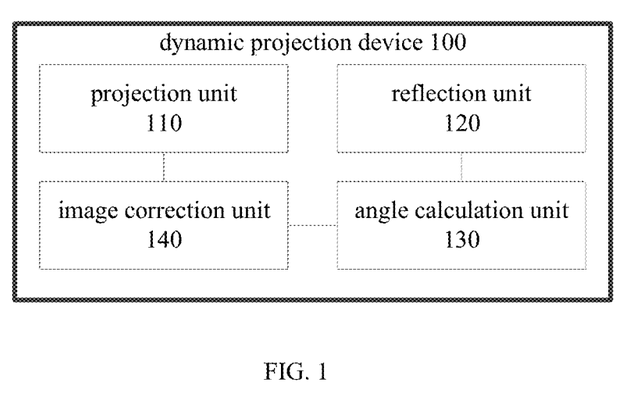
FIG. 1 is a schematic structural diagram of a dynamic projection device provided by an embodiment of the present disclosure.

The present disclosure provides an embodiment of a dynamic projection device. Referring to FIG. 1, a schematic structural diagram of a dynamic projection device provided by an embodiment of the present disclosure is shown. The device 100 includes a projection unit 110, a reflection unit 120, an angle calculation unit 130, and an image correction unit 140.

The projection unit 110 is configured to output a projection picture according to a projection image. Specifically, the projection unit is configured to project pictures, videos and the like desired by a user.

In an embodiment of the present disclosure, the projection unit 110 may be a lens group configured to magnify a projection image and output a projection picture of a predetermined size. The size of the projection picture is determined by the magnification of the lens group.

The reflection unit 120 is configured to reflect the projection picture to a target projection position. Specifically, the reflection unit 120 is placed opposite to the projection unit 110, and a relative angle with the projection unit 110 can be adjusted for reflecting a picture projected by the projection unit 110 to a target projection position.

In an embodiment of the present disclosure, the reflection unit 120 preferably employs an optical device having a high reflectivity to ensure the quality of the projected picture. And the reflection unit 120 is a reflection device provided with a rotation mechanism which preferably adopts a device with higher measurement precision of the rotation angle so as to ensure that the rotation angle of the reflection unit 120 can be precisely measured and adjusted.

The angle calculation unit 130 is connected to the reflection unit 120 and is configured to calculate a rotation angle of the reflection unit 120.

In an embodiment of the present disclosure, the angle calculation unit 130 may be a computer having a calculation function. The angle calculation unit 130 can directly measure and acquire the rotation angle of the reflection unit 120. Alternatively, more precisely, the rotation angle of the reflection unit 120 is calculated by the deflection angle of the projected picture. In an embodiment of the present disclosure described below, the rotation angle of the reflection unit 120 is calculated using the deflection angle at which the projection picture is acquired, and specifically, reference is made to FIG. 6 described below and its related description.

The image correction unit 140 is connected to the angle calculation unit 130 and the projection unit 110, respectively, and is configured to correct the projected image according to the rotation angle.

In an embodiment of the present disclosure, since the reflection unit 120 rotates so that the projection picture can fall to the target projection position, the projection picture may not only "translate", which means that the projection picture moves to the target projection position, but also "rotate", which means that the projection picture will be rotated around the projection unit 110 as a center, with a distance from the projection picture to the projection unit 110 as a radius. At this time, since the projection space where the projection environment is usually located is relatively complicated, the projection space can be simplified as a rectangular parallelepiped, and the distance between the projection wall surface and the projection unit 110 will change before and after the rotation, so the projection picture will be distorted when projecting onto the projection wall surface where the target projection position is located. Therefore, it is necessary to correct the projection image according to the rotation angle of the reflection unit 120 so that the projection picture is corrected.

An embodiment of the disclosure provides a dynamic projection device; according to the device, the rotation angle of the reflection unit is calculated through the angle calculation unit, and the projection picture is projected dynamically by the reflection unit; the projection picture is corrected according to the rotation angle of the reflection unit through the image correction unit, and finally the projection picture is output through the projection unit. The dynamic projection device provided by the embodiment of the disclosure has a simple structure, can realize dynamic projection of the projection image, and can correct the projection picture, thereby realizing convenient high-quality dynamic projection and being used in various scenes.

Figure 2:
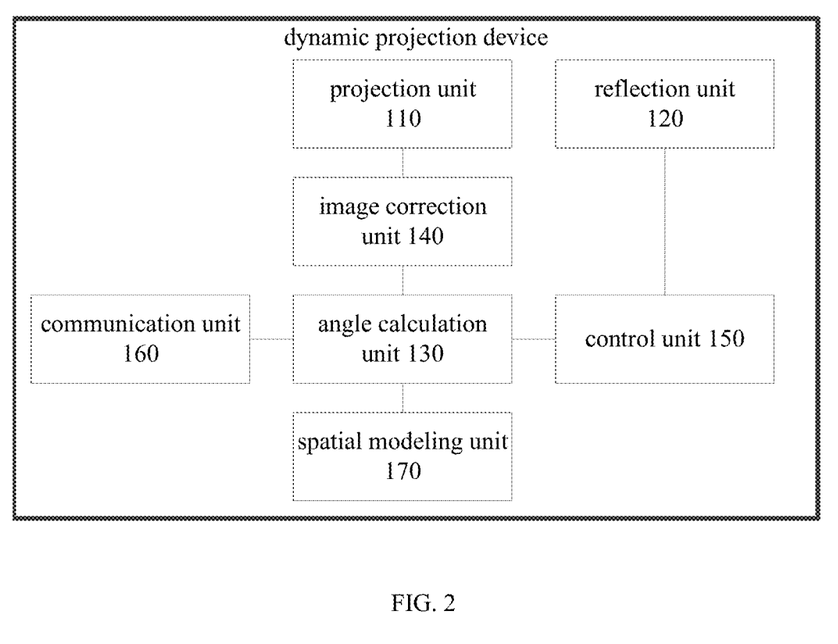
FIG. 2 is a schematic structural diagram of another dynamic projection device provided by an embodiment of the present disclosure.

In some embodiments, referring to FIG. 2, a schematic structural diagram of another dynamic projection device provided by an embodiment of the present disclosure is shown. The device 100 further includes: a control unit 150, a communication unit 160, and a spatial modeling unit 170, based on the dynamic projection device 100 shown in FIG. 1.

The control unit 150 is connected between the angle calculation unit 130 and the reflection unit 120 and is configured to control the reflection unit 120 to rotate to a target position according to the rotation angle so as to control the position of the projection picture. Specifically, the control unit 150 may be a rotating device capable of adjusting a reflection angle of the reflection unit 120, such as a pan-tilt or a multi-dimensional motion platform.

The communication unit 160 is connected to the angle calculation unit 130 and configured to receive user instruction information and input the user instruction information to the angle calculation unit 130. Wherein, the user instruction information includes: target projection position information. The instruction is a user voice instruction, and/or a user gesture instruction, and/or a remote controller instruction.

Specifically, the user instruction information may be control instructions such as user voice, and gestures, or instructions issued through a remote control, or target location information of the projection picture, including target location information specified by the user, and target position information lamp obtained based on user location and posture calculation; and the correction of the projection content mainly includes auto focus, rotation correction, and keystone correction.

The spatial modeling unit 170 is connected with the angle calculation unit 130 and configured to acquire spatial three-dimensional information of the projection environment, establish a spatial three-dimensional model according to the spatial three-dimensional information, and input the spatial three-dimensional model to the angle calculation unit 130. The angle calculation unit 130 may calculate a rotation angle that the reflection unit 120 needs to rotate according to the user instruction information and the spatial three-dimensional information. Wherein the spatial three-dimensional information includes: spatial scale information of the projection environment and the position of the dynamic projection device.

Specifically, the spatial three-dimensional model mainly includes the length, width, height of the projection environment and the position of the dynamic projection device, which can be obtained by manual input or by scanning by relevant devices. The spatial modeling unit 170 may be an input window, an infrared three-dimensional tester or a camera, or a combination of a rotating motor and a simple tester or a camera.

Figure 3:
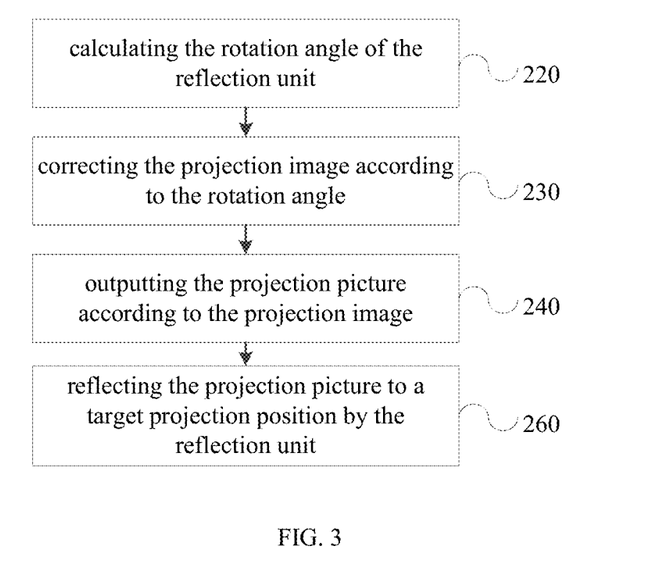
FIG. 3 is a schematic flow diagram of a dynamic projection method provided by an embodiment of the present disclosure.

The present disclosure also provides an embodiment of a dynamic projection method. Referring to FIG. 3, a schematic flowchart of a dynamic projection method provided by an embodiment of the present disclosure is shown. The method includes but is not limited to the following steps.

Step 220: Calculating the Rotation Angle of the Reflection Unit.

In an embodiment of the present disclosure, the rotation angle of the reflecting unit needs to be calculated, and the rotation angle is used to correct the deformation of the projected image; and the rotation angle of the reflection unit can be calculated through the deflection angle of the projection picture. Specifically, reference is made to FIG. 6 below and its associated description.

Step 230: Correcting the Projection Image According to the Rotation Angle.

In an embodiment of the present disclosure, the correction of the projected image includes auto focus, rotation correction, keystone correction, etc. For a particular projector, a corresponding table of projection distances and position information of the projection lens relative to the lens sleeve may be established. In the dynamic projection method of the present disclosure, as can be seen in conjunction with the following steps 211 to 213 and FIG. 7, it is also necessary to acquire a three-dimensional spatial model of the projection environment prior to step 220. After obtaining the three-dimensional spatial model of the projection environment, the distance between each projection position and the reflective dynamic projection device can be obtained, in turn the position of the projection lens relative to the lens sleeve can be obtained by consulting the correspondence table, and the projection lens can be controlled to move to the corresponding position to achieve auto focus.

Because the rotating mechanism of the reflective dynamic projection device provided by the present disclosure is a reflection unit, when the reflection unit rotates in the horizontal direction, it will cause the projection picture not only to "translate", but also to "rotate". This moment, the projection picture doesn't remain "right facing" the viewer. In order to ensure that the projected picture always remains at an angle right facing the viewer, rotation correction is required. Through the analysis, it can be concluded that when the reflection unit rotates clockwise (viewed from top to bottom) in the horizontal direction by an angle of α, the projection picture will rotate counterclockwise by an angle of α. At this time, it needs to be corrected by clockwise rotation, and the correction angle is α; when the reflection unit rotates counterclockwise (viewed from top to bottom) by an angle of α, the projection picture will rotate clockwise by an angle of α. At this time, it needs to be corrected by counterclockwise rotation, and the correction angle is α.

Assuming that an projection content is an image, assuming that coordinates of a certain pixel point are (x, y), rotating it in the counterclockwise direction by an angle of α, new coordinates become (x', y'), which can be calculated by the following equation:

$$\begin{pmatrix} x' \\ y' \end{pmatrix} = \begin{pmatrix} \cos\alpha & -\sin\alpha \\ \sin\alpha & \cos\alpha \end{pmatrix} \begin{pmatrix} x \\ y \end{pmatrix}$$

And for each pixel in the original image, new coordinates may be obtained by calculating according to the equation, thereby obtaining the corrected image. The corrected new image may remain "right facing" the viewer relative to the original projected image.

Because the reflection unit rotates to enable the projection picture to deflect on the projection wall surface, the projection picture appears as a trapezoid and needs to be corrected. The corrected projection image can be calculated from the deflection angles α and β of the projection picture in the horizontal and vertical directions.

Step 240: Outputting the Projection Picture According to the Projection Image.

In an embodiment of the present disclosure, the projection image is an image or a video picture previously to be projected stored in the projection device, and the projection picture is output through the projection unit after being corrected by the correction method described in step 230. The projection picture is typically a magnified image of the projection image, and the projection unit is typically a magnifying lens group.

Step 260: Reflecting the Projection Picture to a Target Projection Position by the Reflection Unit.

In the embodiment of the present disclosure, when the projection image is projected by the projection unit, the projection picture is also reflected by the reflection unit to a target projection position for projection along a target projection direction.

An embodiment of the present disclosure provides a dynamic projection method; according to the method, a rotation angle of a reflection unit is calculated through a calculation unit; a projection image is corrected according to the rotation angle; a projection picture is output according to the projection image, and finally the projection picture is reflected to a target projection position by the reflection unit. According to the dynamic projection method provided by the embodiment of the present disclosure can realize the dynamic projection of the projected image and can correct the projection picture.

Figure 4:
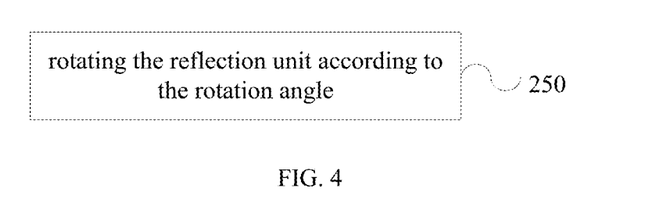
FIG. 4 is a schematic flow diagram of another dynamic projection method provided by an embodiment of the present disclosure.

In some embodiments, referring to FIG. 4, the method further includes the following step, based on the dynamic projection method shown in FIG. 3.

Step 250: Rotating the Reflection Unit According to the Rotation Angle.

In an embodiment of the present disclosure, a control unit may be provided for controlling the rotation of the reflecting unit. Specifically, the function can be realized by the central processing unit sending a serial port instruction to the control unit for execution, such as a pan-tilt or a multi-dimensional motion platform.

Figure 5:
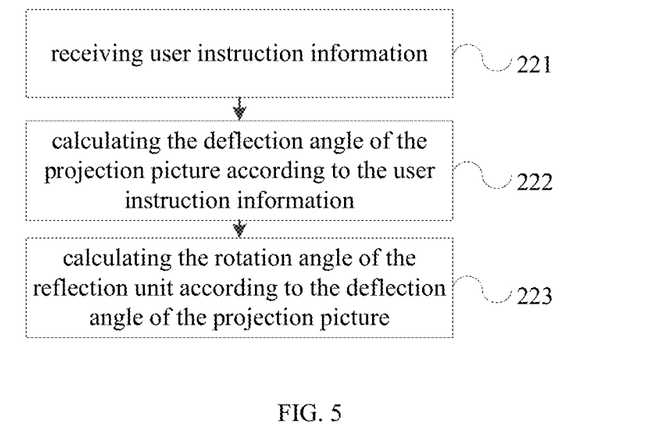
FIG. 5 is a schematic sub-flow diagram of the method of step 220 of FIG. 3.

In some embodiments, referring to FIG. 5, the step 220 specifically includes the following steps.

Step 221: Receiving User Instruction Information. Wherein, the User Instruction Information Includes: Target Projection Position Information. The Instruction is a User Voice Instruction, and/or a User Gesture Instruction, and/or a Remote Controller Instruction.

Step 222: Calculating a Deflection Angle of the Projection Picture According to the User Instruction Information.

Step 223: Calculating the Rotation Angle of the Reflection Unit According to the Deflection Angle of the Projection Picture.

In an embodiment of the present disclosure, the projection picture produces a translation in the horizontal direction when the reflecting unit is moved in the horizontal direction. It is easy to find that the rotation angle of the reflection unit in the horizontal direction coincides with the deflection angle of the projection picture in the horizontal direction. That is: when the projected picture is deflected by an angle α in the horizontal direction, the horizontal rotation angle of the reflection unit is also α.

Figure 6:
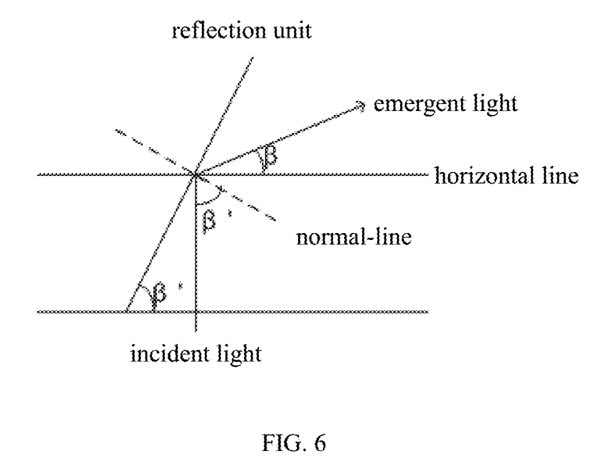
FIG. 6 is a schematic relation view of a rotation angle of a reflection unit and a deflection angle of a projection picture provided by an embodiment of the present disclosure.

In addition, referring to FIG. 6 collectively, a schematic relation view of a rotation angle of a reflection unit and a deflection angle of a projection picture provided by an embodiment of the present invention is shown. When the reflection unit moves in the vertical direction, the projection picture produces a translation in the vertical direction. As shown in FIG. 6, assuming that the elevation angle of the reflection unit is β', and the elevation angle of the reflected light of the reflection unit (i.e., the deflection angle of the projected picture in the vertical direction) with respect to the horizontal line is β, it can be seen from the following figure:

$$\beta = 2\beta' - \frac{\pi}{2}$$

Obviously, when β'>π/4, β>0, i.e. the projected picture is higher than the horizontal line, otherwise it is lower than the horizontal line. It is further possible to obtain:

$$\beta' = \frac{1}{2}\left(\beta + \frac{\pi}{2}\right)$$

In summary, when the deflection angles of the projection picture in the horizontal and vertical directions are α and β, respectively, the angle at which the reflection unit needs to rotate in the horizontal direction is α and the angle at which rotation in the vertical direction needs to be ½(β+π/2).

Figure 7:
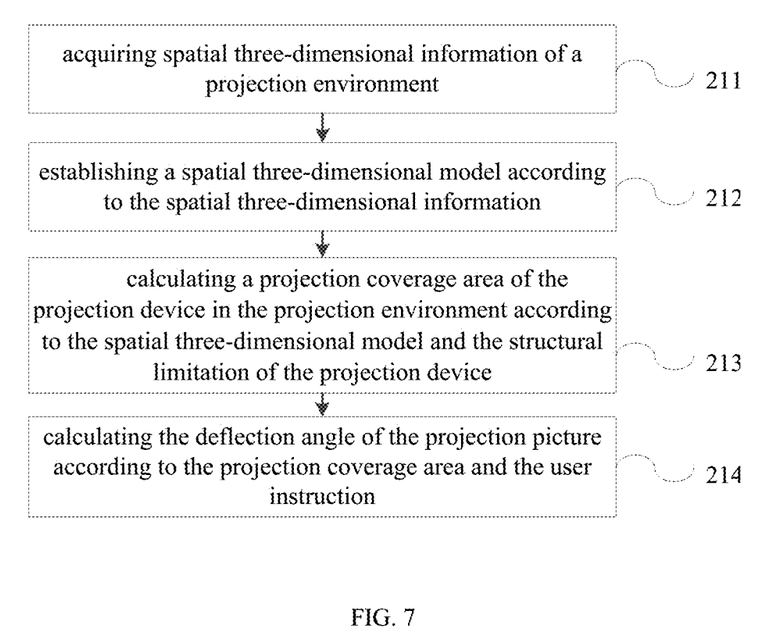
FIG. 7 is a schematic flow diagram of another dynamic projection method provided by an embodiment of the present disclosure.

In some embodiments, referring to FIG. 7, prior to step 222, the method further includes the following steps, based on the method shown in FIG. 5.

Step 211: Acquiring Spatial Three-Dimensional Information of a Projection Environment.

Step 212: Establishing a Spatial Three-Dimensional Model According to the Spatial Three-Dimensional Information.

Specifically, the acquiring spatial three-dimensional information of a projection environment can be achieved by scanning the spatial environment with an infrared three-dimensional tester or a camera, the main results including spatial scale information of the projection environment and where the projection device is located.

Step 213: Calculating a Coverage Area of the Projection Area of the Projection Device in the Projection Environment According to the Spatial Three-Dimensional Model and a Structural Limitation of the Projection Device.

In an embodiment of the disclosure, the coverage area of the calculated projection area can be calculated from a three-dimensional model of the projection environment and the rotation angle limit of the reflection unit.

Figure 8A:
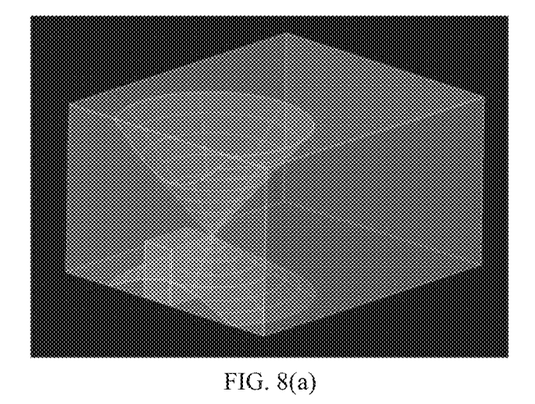
Figure 8B:
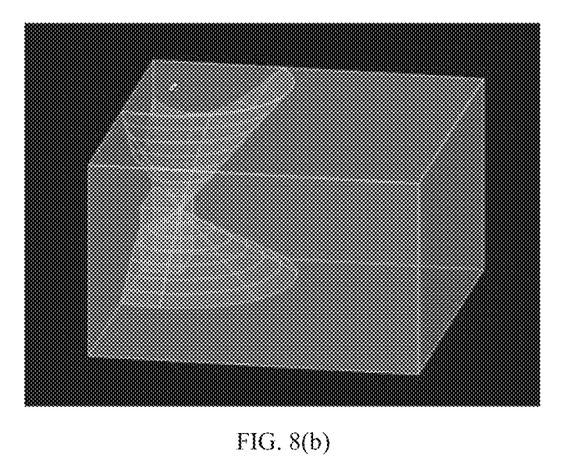

For example, referring collectively to FIGS. 8(a) and 8(b), FIG. 8(a) is a schematic diagram of a coverage area of a projection area when the dynamic projection device provided by an embodiment of the present disclosure is at an edge of a room; and FIG. 8(b) is a schematic diagram of a coverage area of a projection area when the dynamic projection device provided by an embodiment of the present disclosure is at a corner of the room. The cube is a dynamic projection device, the conical curves are intersection lines of edge light rays with a ceiling, a floor and a side wall surface, and a blind area is formed in the curve range.

Specifically, in FIGS. 8(a) and 8(b), assuming that the length, width and height of the room are 5 m, 5 m and 3 m, respectively, and the height of the dynamic projection device in the room is 1 m. The distance between the mirror surface and the optical machine when the reflection unit is horizontally placed is 0.05 m, and the height of the device housing and the optical machine is the same, it can be calculated that the projection blind area of the dynamic projection device exists in the ceiling and the floor, and the radius is about 1.6 m. Other areas can be used as projection areas to display projection contents.

Step 214: Calculating the Deflection Angle of the Projection Picture According to the Coverage Area of the Projection Area and the User Instruction.

In an embodiment of the present disclosure, after acquiring the three-dimensional spatial model of the projection environment, each projection wall surface can be treated as a two-dimensional plane, and establishing a Cartesian coordinate system in the plane is helpful for calculating the deflection angle of the projection picture.

Figure 9:
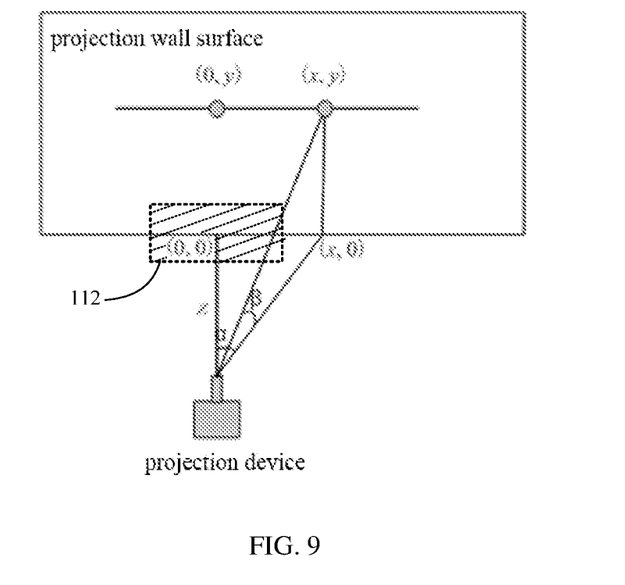
FIG. 9 is a schematic diagram of coordinates for calculating a deflection angle of a projection picture provided by an embodiment of the present disclosure.

For example, referring collectively to FIG. 9, a schematic diagram of coordinates for calculating a deflection angle of a projection picture 112 provided by an embodiment of the present disclosure is shown. Assuming that the vertical distance between the dynamic projection device and the projection wall surface is z, the coordinates of the points of the dynamic projection device right facing the projection wall surface are set to be (0, 0), the horizontal rightward direction is denoted as an x-axis, and the vertical upward direction is denoted as a y-axis. When the center point of the projection picture 112 is located at the coordinates (0, 0), the projection picture 112 is considered not to be deflected. If it is desired to center the projected picture in position (x, y), the projection picture needs to be deflected by an angle of α in the horizontal direction and by an angle of β in the vertical direction. According to the trigonometric function relation, it can be obtained that:

$$\alpha = \tan^{-1}\left(\frac{x}{z}\right)$$
$$\beta = \tan^{-1}\left(\frac{y}{\sqrt{x^2 + z^2}}\right)$$

Thus, the deflection angles α and β of the projection picture in the horizontal direction and the vertical direction can be obtained. The deflection angles α and β in the horizontal and vertical directions are substituted in the above step 223, and further, the rotation angle of the reflection unit can be calculated.

Figure 10:
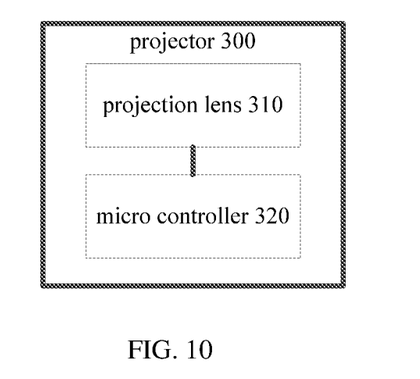
FIG. 10 is a schematic structural diagram of a projector provided by an embodiment of the present disclosure.

The present disclosure also provides an embodiment of a projector. Referring to FIG. 10, a schematic structural diagram of a projector provided by an embodiment of the present disclosure is shown. The projector 300 includes: a projection lens 310, and a micro-controller 320 configured to control the projection lens 310 to project a projection picture, the micro-controller 320 being capable of performing a dynamic projection method as described in the above embodiments.

The projection lens 310 is a lens capable of projecting a projection picture, and includes, but is not limited to, the projection unit 110 and the reflection unit 120 according to the above-described device embodiment. The projection lens 310 is a mechanical device in the projector 300 configured to output the projection picture calculated and processed by the micro-controller 320 as a projection picture.

The micro-controller 320 is a microcomputer configured to set various parameters, acquire various parameters, store various parameters, receive various information, process various information, and transmit various information and instructions. The micro controller 320 is configured to calculate the rotation angle of the reflection unit, correct the projection image according to the rotation angle, and control the projection lens 310 to output the instruction of the projection picture so as to realize dynamic projection.

The micro-controller 320 includes, but is not limited to, all modules as in the device embodiments described above. The data transmission mode/communication mode/connection mode of the projection lens 310 and the micro-controller 320 in practical applications can be wired connection or wireless connection. For example, the projection lens 310 and the micro-controller 320 may be connected by a bus. The projection lens 310 and the micro-controller 320 may be one device installed in a whole or two or more independent devices in which one or more modules are independently provided.

The micro controller 320 can execute the dynamic projection method provided by the embodiment of the disclosure, and has corresponding functional modules and beneficial effects for executing the method. For technical details not described in detail in this embodiment, reference can be made to the dynamic projection method provided by the embodiment of the present disclosure.

The present disclosure also provides an embodiment of a computer-readable storage medium.

The computer-readable storage medium stores computer-executable instructions that are executed by one or more processors, such as a micro-controller 320 of FIG. 10, to cause the one or more processors to perform the dynamic projection method of any of the method embodiments described above, such as performing method steps 220 through 260 of FIG. 3 and/or method step 250 of FIG. 4 described above, and/or method steps 211 through 214 in FIG. 6, to implement the functions of units 110-140 in FIG. 1 and/or units 110-170 in FIG. 2.

Through the description of the above implementation manners, those of ordinary skill in the art can clearly understand that each implementation manner can be implemented by software plus a general hardware platform, and of course, it can also be implemented by hardware. It will be appreciated by those of ordinary skill in the art that all or part of the processes for implementing the above-described embodiments may be implemented by computer programs, which may be stored in a non-transitory computer-readable storage medium and which, when executed, may include the processes of the embodiments of the methods described above. The instructions are stored in the micro-controller and can be various types of microcomputers.

The computer readable storage medium can execute the dynamic projection method provided by the embodiment of the disclosure, and has corresponding functional modules and beneficial effects. For technical details not described in detail in this embodiment, reference can be made to the dynamic projection method provided by the embodiment of the present disclosure.

The present disclosure also provides embodiments of a computer program product.

The computer program product includes a computer program stored on a computer-readable storage medium, the computer program including program instructions which, when executed by a computer, cause the computer to carry out the dynamic projection method as described above, such as performing method steps 220 through 260 of FIG. 3 and/or method step 250 of FIG. 4 described above, and/or method steps 211 through 214 in FIG. 6, to implement the functions of units 110-140 in FIG. 1 and/or units 110-170 in FIG. 2.

The product can execute the dynamic projection method provided by the embodiment of the present disclosure, and has corresponding functional modules and beneficial effects. For technical details not described in detail in this embodiment, reference can be made to the dynamic projection method provided by the embodiment of the present disclosure.

The embodiments of the present disclosure provide a dynamic projection device, a dynamic projection method, and a projector; according to the device, the rotation angle of the reflection unit is calculated through the angle calculation unit, and the projection picture is projected dynamically by the reflection unit; the projection image is corrected according to the rotation angle of the reflection unit through the image correction unit, and finally the projection picture is output through the projection unit. The dynamic projection device provided by the embodiment of the present disclosure has a simple structure, can realize dynamic projection of the projection image, and can correct the projection picture.

Finally, it should be noted that: the above embodiments are merely illustrative of the technical solutions of the present disclosure and are not intended to be limiting thereof. Under the idea of the present disclosure, the technical features of the above embodiments or different embodiments can also be combined. There are many other variations in different aspects of the present disclosure as described above. For the sake of brevity, they are not provided in details. Although the present disclosure has been described in detail with reference to the foregoing embodiments, those skilled in the art will appreciate that: the technical solutions of the above-mentioned embodiments can still be modified, or some of the technical features thereof can be equivalently replaced; such modifications or substitutions do not depart from the scope of the various embodiments of this disclosure.

The invention claimed is:

1. A dynamic projection device, comprising:
   a projection unit configured to output a projection picture by magnifying a projection image;
   a reflection unit configured to reflect the projection picture to a target projection position;
   an angle calculation unit connected with the reflection unit and configured to calculate a rotation angle of the reflection unit;
   an image correction unit connected with the angle calculation unit and the projection unit, respectively, and configured to correct the projection image according to the rotation angle; and
   a control unit connected between the angle calculation unit and the reflection unit and configured to control the reflection unit to rotate according to the rotation angle.

2. The dynamic projection device of claim 1, further comprising:
   a communication unit connected with the angle calculation unit and configured to receive user instruction information and input the user instruction information to the angle calculation unit.

3. The dynamic projection device of claim 2, wherein:
   the user instruction information comprises target projection position information;
   the instruction is a user voice instruction, and/or a user gesture instruction, and/or a remote controller instruction.

4. The dynamic projection device of claim 1, further comprising:
   a spatial modeling unit connected with the angle calculation unit and configured to acquire spatial three-dimensional information of a projection environment, establish a spatial three-dimensional model according to the spatial three-dimensional information, and input the spatial three-dimensional model to the angle calculation unit.

5. A dynamic projection method, comprising:
   calculating a rotation angle of a reflection unit;
   correcting a projected image according to the rotation angle;
   outputting a projection picture by magnifying the projection image using a projection lens; and
   reflecting the projection picture to a target projection position by the reflection unit;
   wherein, calculating a rotation angle of a reflection unit specifically comprises:
   receiving user instruction information;
   calculating a deflection angle of the projection picture according to the user instruction information; and
   calculating the rotation angle of the reflection unit according to the deflection angle of the projection picture.

6. The dynamic projection method of claim 5, further comprising, prior to the reflecting the projection picture to a target projection position by the reflection unit:
   rotating the reflection unit according to the rotation angle.

7. The dynamic projection method of claim 5, wherein,
   the user instruction information comprises target projection position information;
   the instruction is a user voice instruction, and/or a user gesture instruction, and/or a remote controller instruction.

8. The dynamic projection method of claim 5, further comprising, prior to the calculating a deflection angle of the projection picture according to the user instruction information:
   acquiring spatial three-dimensional information of a projection environment;
   establishing a spatial three-dimensional model according to the spatial three-dimensional information;
   calculating a coverage area of a projection area of a projection device in the projection environment according to the spatial three-dimensional model and a structural limitation of the projection device; and
   calculating the deflection angle of the projection picture according to the coverage area of the projection area and the user instruction information.

9. A projector comprising: a projection lens, and a micro-controller configured to control the projection lens to project a projection picture, the micro-controller being capable of performing a dynamic projection method comprising:
   calculating a rotation angle of a reflection unit;
   correcting a projected image according to the rotation angle;
   outputting the projection picture by magnifying the projection image using the projection lens; and
   reflecting the projection picture to a target projection position by the reflection unit;
   wherein, calculating a rotation angle of a reflection unit specifically comprises:
   receiving user instruction information;
   calculating a deflection angle of the projection picture according to the user instruction information; and
   calculating the rotation angle of the reflection unit according to the deflection angle of the projection picture.

10. The projector of claim 9, wherein the dynamic projection method further comprises, prior to the reflecting the projection picture to a target projection position by the reflection unit:
    rotating the reflection unit according to the rotation angle.

11. The projector of claim 9, wherein,
    the user instruction information comprises target projection position information;
    the instruction is a user voice instruction, and/or a user gesture instruction, and/or a remote controller instruction.

12. The projector of claim 9, wherein the dynamic projection method further comprises, prior to the calculating a deflection angle of the projection picture according to the user instruction information:
    acquiring spatial three-dimensional information of a projection environment;
    establishing a spatial three-dimensional model according to the spatial three-dimensional information;
    calculating a coverage area of a projection area of a projection device in the projection environment according to the spatial three-dimensional model and a structural limitation of the projection device; and
    calculating the deflection angle of the projection picture according to the coverage area of the projection area and the user instruction information.

* * * * *